US008844051B2

(12) United States Patent
Arrasvuori et al.

(10) Patent No.: US 8,844,051 B2
(45) Date of Patent: Sep. 23, 2014

(54) METHOD AND APPARATUS FOR MEDIA RELAYING AND MIXING IN SOCIAL NETWORKS (75) Inventors: Juha Henrik Arrasvuori, Tampere (FI); Hannu J. Korhonen, Kangasala (FI); Markus Montola, Helsinki (FI)

(73) Assignee: Nokia Corporation, Espoo (FI)

( * ) Notice: Subject to any disclaimer, the term of this patent is extended or adjusted under 35 U.S.C. 154(b) by 666 days.

(21) Appl. No.: 12/556,354

(22) Filed: Sep. 9, 2009

(65) Prior Publication Data

US 2011/0061108 A1   Mar. 10, 2011

(51) Int. Cl.
G06F 7/04 (2006.01)
G06F 21/10 (2013.01)
G06F 17/30 (2006.01)
H04N 7/16 (2011.01)
H04N 7/167 (2011.01)
H04K 1/00 (2006.01)
G06F 12/14 (2006.01)
H04W 4/00 (2009.01)

(52) U.S. Cl.
CPC . G06F 21/10 (2013.01); H04W 4/00 (2013.01)
USPC ........ 726/27; 726/2; 726/26; 726/28; 726/29; 726/31; 380/201; 380/204; 380/225; 380/276; 713/187

(58) Field of Classification Search
CPC ............. G06F 21/10; G06F 7/04; H04W 4/00
USPC ........... 726/2, 26–31; 713/187; 380/255–276; 709/203, 226
See application file for complete search history.

(56) References Cited

U.S. PATENT DOCUMENTS

| 5,020,101 | A | 5/1991 | Brotz et al. |
| 5,857,171 | A * | 1/1999 | Kageyama et al. ........... 704/268 |
| 7,730,216 | B1 * | 6/2010 | Issa et al. ...................... 709/250 |
| 2003/0208638 | A1 * | 11/2003 | Abrams et al. ................ 709/328 |
| 2005/0192000 | A1 | 9/2005 | Lloyd |
| 2006/0184673 | A1 | 8/2006 | Liebman |

(Continued)

FOREIGN PATENT DOCUMENTS

| EP | 0 715 243 A1 | 6/1996 |
| WO | 00/58811 A2 | 10/2000 |
| WO | WO 01/35559 A2 | 5/2001 |
| WO | WO 03/030143 A1 | 4/2003 |

OTHER PUBLICATIONS

Manoj Parameswaran et al., P2P Networking: An Information-Sharing Alternative, Jul. 2001, IEEE, pp. 31-38.*

(Continued)

Primary Examiner — Evans Desrosiers
Assistant Examiner — Fahimeh Mohammadi
(74) Attorney, Agent, or Firm — Ditthavong & Steiner, P.C.

(57) ABSTRACT

An approach is provided for relaying media and creating new content from the media via a social network. Audio content is caused to be received from one of a plurality of devices. The one device is associated with a member of a first list of contacts. New audio content is generated based on the received audio content. The new audio content is caused, at least in part, to be transmitted to another one of the devices. The other one device is associated with a member of a second list of contacts.

15 Claims, 8 Drawing Sheets

(56) References Cited

U.S. PATENT DOCUMENTS

| | | | |
|---|---|---|---|
| 2007/0083674 A1* | 4/2007 | Mulder et al. | 709/246 |
| 2007/0207780 A1* | 9/2007 | McLean | 455/414.1 |
| 2007/0255785 A1 | 11/2007 | Hayashi et al. | |
| 2007/0270988 A1* | 11/2007 | Goldstein et al. | 700/94 |
| 2007/0282949 A1* | 12/2007 | Fischer et al. | 709/204 |
| 2007/0289022 A1* | 12/2007 | Wittkotter | 726/27 |
| 2008/0077529 A1 | 3/2008 | Swanburg | |
| 2008/0092240 A1* | 4/2008 | Sitrick et al. | 726/27 |
| 2008/0215509 A1* | 9/2008 | Charlton | 706/11 |
| 2008/0320139 A1* | 12/2008 | Fukuda et al. | 709/226 |
| 2009/0106261 A1 | 4/2009 | Nagasaka et al. | |
| 2009/0129605 A1* | 5/2009 | Camp et al. | 381/77 |
| 2009/0228989 A1* | 9/2009 | Maurer | 726/28 |
| 2009/0265416 A1 | 10/2009 | Svendsen et al. | |
| 2009/0265417 A1* | 10/2009 | Svendsen et al. | 709/203 |
| 2009/0265426 A1 | 10/2009 | Svendsen et al. | |
| 2009/0326970 A1* | 12/2009 | Estrada et al. | 705/1 |
| 2010/0023578 A1* | 1/2010 | Brant et al. | 709/203 |
| 2010/0031299 A1* | 2/2010 | Harrang et al. | 725/80 |
| 2010/0235443 A1* | 9/2010 | Laiho et al. | 709/204 |
| 2010/0241711 A1* | 9/2010 | Ansari et al. | 709/205 |

OTHER PUBLICATIONS

Scott Carter et al., Digital Graffiti: Public Annotation of Multimedia Content, 2004, ACM, pp. 1207-1010.*

Jian Liang et al., Pollution in P2P File Sharing Systems, Mar. 2005, IEEE, vol. 2, pp. 1174-1185.*

Ronald Schroeter et al., FilmEd—Collaborative Video Indexing, Annotation and Discussion Tools Over Broadband Networks, Jan. 2004, IEEE, pp. 346-353.*

International search report and written opinion for corresponding international application No. PCT/FI2010/050660 dated Dec. 14, 2010, pp. 1-14.

Supplementary European Search Report for corresponding European Application No. 10 81 5036 dated Dec. 17, 2013, 6 pages.

Kaplan, M. "IBM Cryptolopes, SuperDistribution and Digital Rights Management." Internet Citation, Dec. 30, 1996, XP002132994. Retrieved from the Internet: URL:http://www.research.ibm.com/people/k/kaplan/cryptolope-docs/crypap/html [Retrieved on Mar. 14, 2000] 7 pages.

* cited by examiner

METHOD AND APPARATUS FOR MEDIA RELAYING AND MIXING IN SOCIAL NETWORKS

BACKGROUND

Wireless (e.g., cellular) service providers and device manufacturers are continually challenged to deliver value and convenience to consumers by, for example, providing compelling network services. Important differentiators in this industry relate to media services that can be executed on a device. In particular, music may be distributed from a media service provider to a device.

SOME EXAMPLE EMBODIMENTS

According to one embodiment, a method comprises causing, at least in part, receiving audio content from one of a plurality of devices, wherein the one device is associated with a member of a first list of contacts. The method also comprises generating new audio content based on the received audio content. The method further comprises causing, at least in part, transmission of the new audio content to another one of the devices, wherein the other one device is associated with a member of a second list of contacts.

According to another embodiment, an apparatus comprising at least one processor, and at least one memory including computer program code, the at least one memory and the computer program code configured to, with the at least one processor, cause the apparatus to cause, at least in part, receiving audio content from one of a plurality of devices, wherein the one device is associated with a member of a first list of contacts. The apparatus is also caused to generate new audio content based on the received audio content. The apparatus is further caused to cause, at least in part, transmission of the new audio content to another one of the devices, wherein the other one device is associated with a member of a second list of contacts.

According to another embodiment, a computer-readable storage medium carrying one or more sequences of one or more instructions which, when executed by one or more processors, cause an apparatus to cause, at least in part, receiving audio content from one of a plurality of devices, wherein the one device is associated with a member of a first list of contacts. The apparatus is also caused to generate new audio content based on the received audio content. The apparatus is further caused to cause, at least in part, transmission of the new audio content to another one of the devices, wherein the other one device is associated with a member of a second list of contacts.

According to another embodiment, an apparatus comprises means for causing, at least in part, receiving audio content from one of a plurality of devices, wherein the one device is associated with a member of a first list of contacts. The apparatus also comprises means for generating new audio content based on the received audio content. The apparatus further comprises means for causing, at least in part, transmission of the new audio content to a another one of the devices, wherein the other one device is associated with a member of a second list of contacts.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method, apparatus, and software for relaying media via a social network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
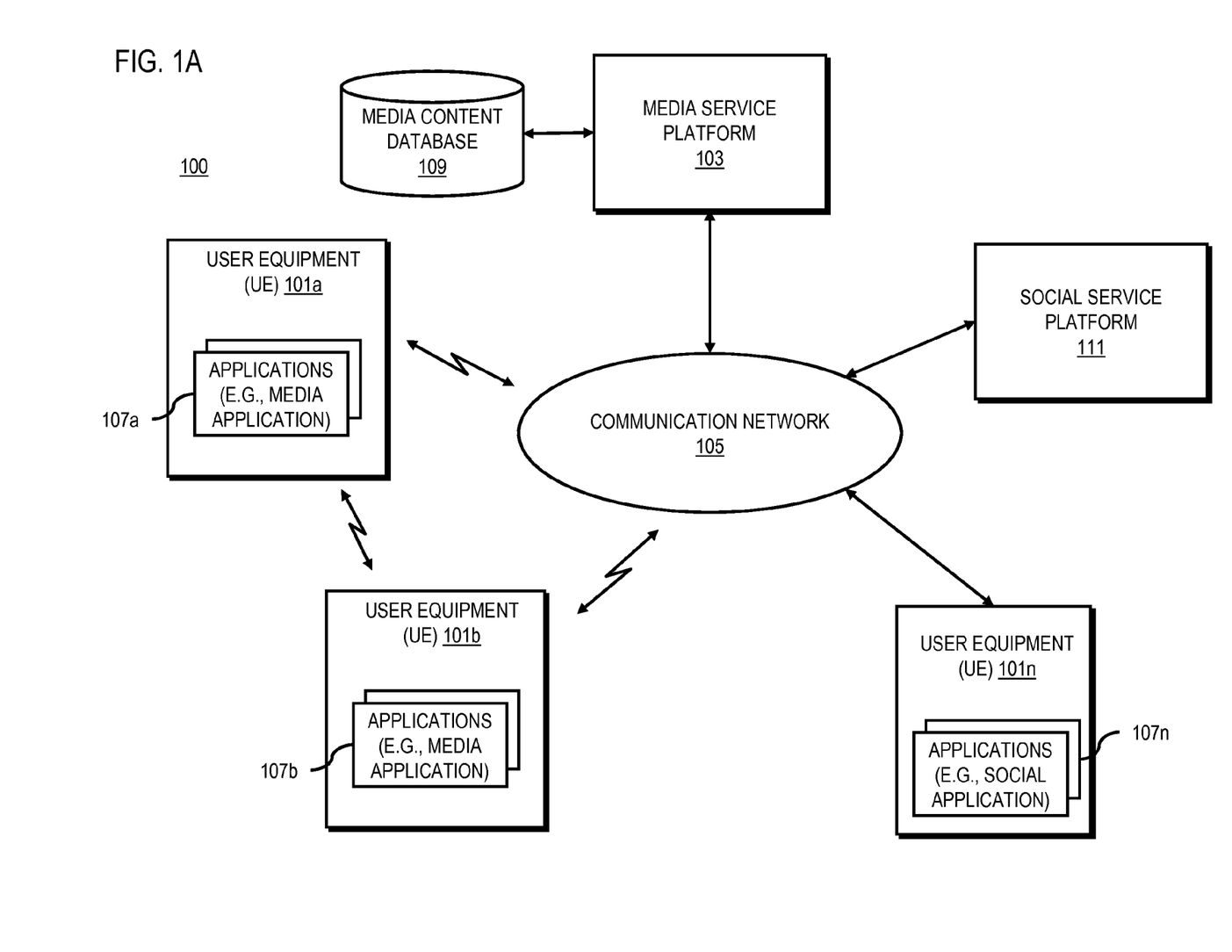
FIG. 1A is a diagram of a system capable of relaying media via a social network, according to one embodiment.
Figure 1B:
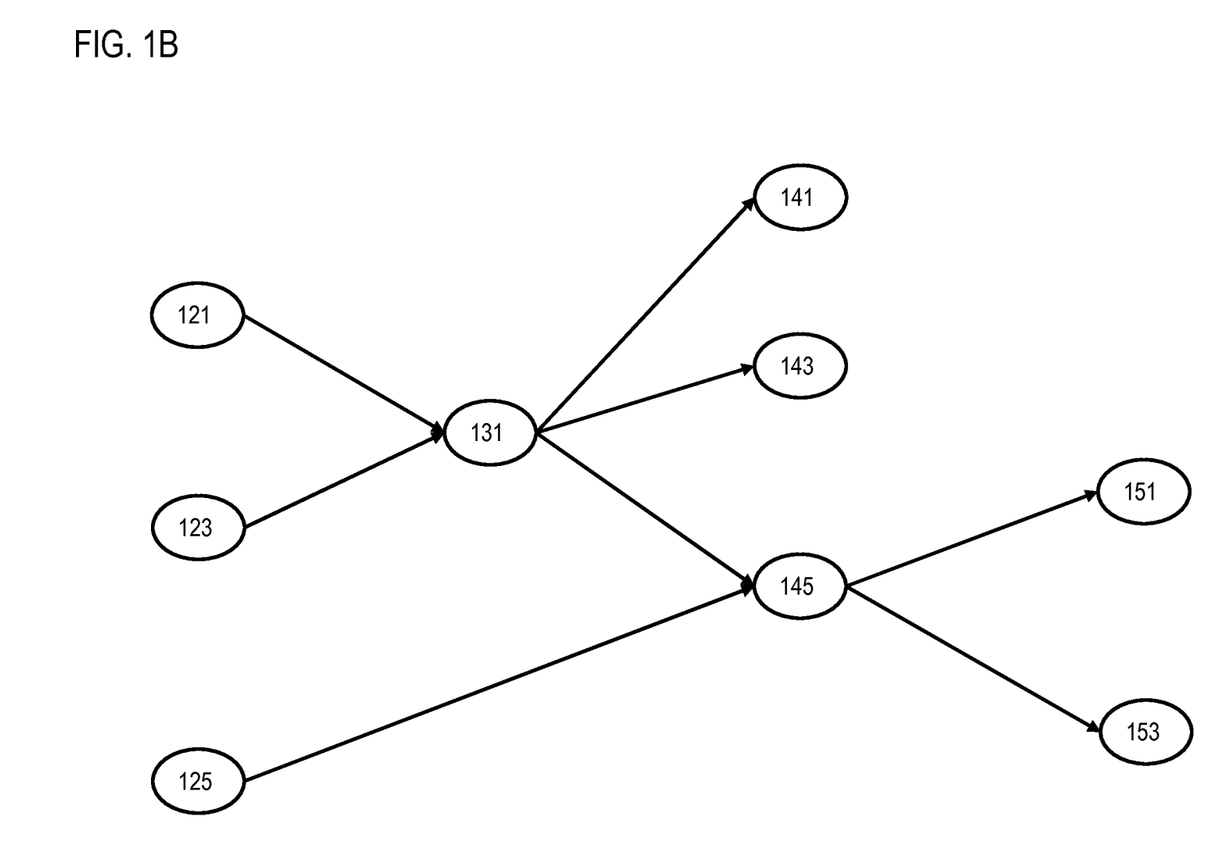
FIG. 1B is a node diagram of a partial social network that can be associated with the system of FIG. 1A, according to one embodiment.

FIG. 1A is a diagram of a system capable of relaying media via a social network, according to one embodiment. The system 100 of FIG. 1A is described with respect to FIG. 1B depicting a diagram of partial social network, according to one embodiment. Under some scenarios, users can access media via subscription services (e.g., COMES WITH MUSIC, NAPSTER TO GO, and RHAPSODY) that allow the users to have unlimited access to a selection of media (e.g., music or video) stored on a remote server. A user can become overwhelmed by the amount of selections of media the user has access to and may not be able to discover and select all of the media the user would enjoy. Moreover, in some devices (e.g., mobile devices), browsing media may be difficult due to a limited screen size of the device. Additionally, browsing media can require attention from a mobile user that can be complex because the mobile user may be multi-tasking.

To address this problem, a system 100 of FIG. 1A introduces the capability to relay media and create new content from the media via a social network. A user equipment (UE) 101a-101n can access a media service platform 103 to retrieve media files, such as music and video, via a communication network 105. A media application 107a, 107b can be used to access media from the media service platform 103 by sending a request to the media service platform 103 for media content and downloading media content from a media content database 109 associated with the media service platform 103. Further, the media application 107a of a UE 101a can connect to a media application 107b of another UE 101b. Under this scenario, the UE 101a can transmit media information (e.g. an audio/music file or stream, a video file or stream, an audio/music playlist, a video playlist, etc.) to the other UE 101b via media applications 107a, 107b. Additionally, a UE 101n can access a social service platform 111 via the communication network 105 using a social application 107n. Media relaying can be accomplished by utilizing contact lists of the social application 107n. In this manner, the UE 101n is able to retrieve social networking contact data from the social service platform 111. Under some scenarios, the social networking contact data can be used as a basis to structure nodes (users) that are tied by types of interdependencies. Further, other UEs 101a, 101b can also use a social networking application (e.g., social application 107n) to enable the UEs 101a, 101b to participate in the social network and utilize social networking contact data from the social service platform 111 or the social networking application. In other exemplary scenarios, the structure of nodes can be tied using interdependencies based on contact data associated with each node as shown in FIG. 1B.

FIG. 1B is a diagram of a partial social network that can be associated with the system of FIG. 1A, according to one embodiment. In this embodiment, the nodes 121, 123, 125, 131, 141, 143, 145, 151, and 153 can be UEs 101 that are connected by interdependencies (e.g., social networking relationships). In one embodiment, audio (e.g., music) is relayed through a social network of user nodes with connected devices. By way of example, tracks or streams of audio from nodes 121 and 123 can be relayed to node 131. The user at node 131 can then modify the audio in creative ways (e.g., mix the music from node 121 and node 123 or add a comment track associated with one or both of the tracks of music from node 121 and node 123) to create new audio content as well as relay the audio tracks or streams to contact nodes 141, 143, 145 of the node 131. Additionally, the creator of the new audio content can add access rules to the new content (e.g., only allow immediate contact nodes access to a comment track) before sending it to other contact nodes. Further, the user of node 145 can receive tracks or streams from nodes 125 and 131 directly or from node 121 and node 123 indirectly through node 131. Under one scenario, nodes 151 and 153 may be able to receive any of the audio available to node 145. Thus, a user of a node with more contacts can potentially have access to a greater variety of audio content because the user will have access to music created by other nodes in the user's social network. Additionally, the user of the node with more contacts may have more variety in music because the additional contacts may have and/or create music in additional, varied styles of music.

A user would receive the benefit of having access to more content with more contacts. However, this may lead to clutter on a UE 101 screen. Thus, a UE 101 can include the ability to create a mechanism to organize the contacts and media available to the user via the media application 107. One such mechanism may include using criteria to sort lists of contacts (e.g., a top ten list, a most recent list, a most listened to list, a favorites list, etc.). Criteria for one list could include sorting through contacts for contacts that have the most contacts themselves. Criteria for another list can also include sorting through contacts for contacts that represent the broadest range of musical styles. To sort the list, the profile of each user can be accessed by other nodes. The profiles can include a definition of the music styles the contacts prefer. Additionally and/or alternatively, the profiles may include the music styles from the metadata of files the contact listens to the most, stored on the contact's current playlist (e.g., metadata regarding soon to be played music), or stored on the contacts UE 101.

Returning to FIG. 1A, the system 100 includes, for instance, a media service platform 103. In one embodiment, the media service platform 103 can include a media content database 109 that includes various media files (e.g., audio, video, etc.). The media service platform 103 provides media (e.g., audio content) access to users of the service. For example, the users can include subscribers that can access unlimited media from the media service platform 103. In this manner, subscribers to the service are ensured to have rights or other authorization to play and/or alter the media content received from the service. In one example, a subscriber is licensed to mix and distribute new audio based on other audio content. In another example, a premium subscriber is licensed to stream audio to people that need not be associated with the service (e.g., nonsubscribers).

The system 100 of FIG. 1A includes a social service platform 111, according to one embodiment. The social service platform 111 can include members who form social networks to communicate with colleagues, friends, and other contacts or people. Additionally, the social service platform 111 can have an infrastructure of contacts associated with its members or other external social networks (e.g., FACEBOOK, MYSPACE, etc.) and relationships or interdependencies among the contacts. This infrastructure of contacts can be accessed by a media application 107a, 107b of a UE 101 directly or via an interface in conjunction with a social application 107n. The infrastructure can be based on a node structure of users.

Under one scenario of FIG. 1B, a user/node 131 receives audio streams from nodes 121 and 123. The user at node 131 then mixes the audio streams from nodes 121 and 123 and relays the new mixed stream as well as the original audio streams to users at nodes 141, 143, and 145. The user at node 145 can then select which streams to relay to users at nodes 151 and 153. Users at nodes 151 and 153 have the benefit of content from node 145 and thus can have more content options (e.g., content from node 125) than nodes 141 and 143. Under one embodiment, the nodes represent contacts in a social network. In this embodiment, nodes can have direct contacts and indirect contacts. For example, nodes 121 and 123 would be direct contacts of node 131 and indirect contacts of nodes 141, 143, and 145. Further nodes 121 and 123 would be indirect contacts of nodes 151 and 153 at an additional level apart.

In one embodiment, audio content is streamed from one node to another. In the scenario of FIG. 1B, the arrows point in the direction of streamed audio (e.g., music). In one example, an audio content is streamed in only one direction to avoid creating potential feedback loops. For example, node 121 would not be able to receive the same content that node 121 is streaming to node 131 back from node 131 simultaneously. However, node 121 may receive new content from node 145 via node 131 if it is different from the currently streamed content. A media application 107a of a UE 101 of a node 121 can determine which users can receive and relay music from and to which users in a particular social network. The media application 107a can receive instructions on available users from a media service platform 103 or by reviewing content. For example, a user of a media application 107a can select when to transmit streams, when to receive streams, and/or when to relay streams. In one example, the user at node 131 may select to only be a relay node. Because node 131 is a relay node, the user at node 145 can retrieve and play content from node 121 via node 131 without node 131 playing or changing the content. In another example, the user of node 131 can select the audio stream to relay to node 145.

Additionally, the media application 107a may choose to receive and play content from node 121 or node 123 dynamically. Under this scenario, the media application 107a can determine the type of music to select from input nodes depending on preferences or the musical tastes of the user of the media application 107a. These preferences can be defined by the user and stored in a user profile, or the media application 107a may determine the preferences or the musical tastes of the user by analyzing the music that the user has recently listened to or has listened to over a period of time. The user can set parameters defining the time period. Additionally, incoming music may have data tags or metadata associating the music with genres or styles of music. The music can be analyzed by examining these tags or metadata. The media application 107a may also have access to a database (e.g., via the media service platform 103) that associates artists, albums, and/or songs with musical genres or styles. To make a dynamic selection on which content to play, the media application 107a can analyze the available content from nodes 121 and 123 via tags or metadata associated with the content to determine which ones closest match the user's preferences or musical tastes. Additionally or alternatively, the media application 107a may select which content to play based on the user profiles and/or user preferences of the users of node 121 or 123 respectively and on selection rules. In one example, the media application 107a may access user profiles of the nodes 121, 123 and compare the musical preferences or musical tastes of the users of the respective nodes 121, 123 to the user's preferences. Then, the media application 107a selects the content based on a selection rule. The selection rule could include selecting the content that is associated with the closest musical preference or taste matching user node 121, 123. In other examples, the selection rule could include comparing parameters other than musical preferences or tastes (e.g., comparing favorite movies, favorite painters, favorite foods, etc.). These parameters can be stored in the user profiles of the user and users of node 121 and 123.

Moreover, the media application 107a may have a connection to a service (e.g., a social service) that collects information about the audio content usage of users. In one embodiment, UEs 101 are connected to the social service and the media application 107a reports the current media consumption of the user to the social service. The social service may also have access to the contacts of the user and the content usage of those users. The media application 107a can then request the social service determine a recommendation of content for the user based on a comparison of the user's musical preferences and/or tastes to other members of the social service or contacts in one of the user's contact lists based on a selection rule. The user's UE 101 can then receive the recommendation from the social service. The user is then provided the option of listening to the content (e.g., by adding the content to a playlist) or requesting a new recommendation.

As shown in FIG. 1A, the system 100 comprises a user equipment 101 having connectivity to a media service platform 103 and a social service platform 111 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, media service platform 103, and social service platform 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
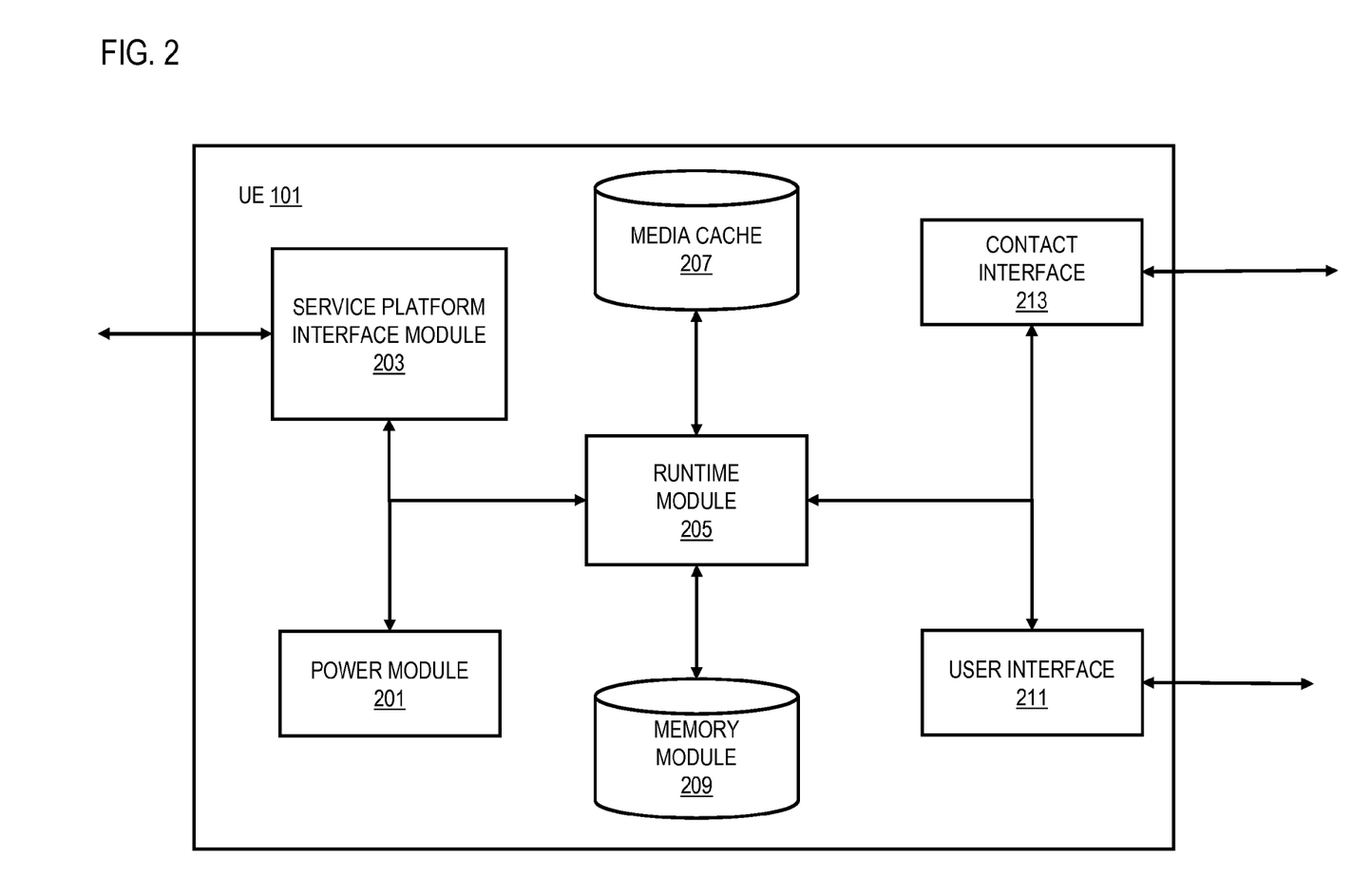
FIG. 2 is a diagram of the components of a user equipment, according to one embodiment.

FIG. 2 is a diagram of the components of a user equipment 101, according to one embodiment. By way of example, the UE 101 includes one or more components for relaying media via a social network. It is contemplated that the functions of these components may be combined in one or more components or performed by other components of equivalent functionality. In this embodiment, the UE 101 includes a power module 201, a service platform interface module 203, a runtime module 205, a media cache 207, a memory module 209, a user interface 211, and a contact interface 213.

The power module 201 provides power to the UE 101. The power module 201 can include any type of power source (e.g., battery, plug-in, etc.). Additionally, the power module 201 can provide power to the components of the UE 101 including processors, memory, and transmitters.

In one embodiment, a UE 101 includes a service platform interface module 203. The service platform interface module 203 is used by the runtime module 205 to communicate with a service platform such as the media service platform 103 or the social service platform 111. In some examples, a social application 107n can use the service platform interface module 203 to communicate with other users utilizing a service of the social service platform 111. Examples of social services include online services such as FACEBOOK, MYSPACE, and LINKEDIN, which keep records of social networks (e.g., contact infrastructure) between users. Additionally, the service platform interface module 203 can retrieve contact infrastructure information from the social service platform 111 and make the contact infrastructure information available to the runtime module 205. Further, media applications 107a and 107b can utilize the service platform interface module 203 to request and download media content such as video, music, and other audio from other users of the social service platform 111.

In addition, the UE 101 can include a media cache 207. The media cache 207 can be utilized to store media content, such as video, music, or other audio. The media cache 207 can also include a buffer that enables the runtime module 205 to stream media to or from an external source.

In one embodiment, the UE 101 includes the user interface 211. The user interface 211 can include various methods of communication. For example, the user interface 211 can include outputs including a visual component (e.g., a screen), an audio component (e.g., amplifiers and speakers), a physical component (e.g., vibrations), and other methods of communication. User inputs can include a touch-screen interface, a scroll-and-click interface, a button interface, a microphone, etc. A user can input a request to download or view media (e.g., audio or video). The user interface 211 can then output the requested media content to a user.

Under one scenario, the UE 101 has a contact interface 213. The contact interface 213 can be used by a runtime module 205 to interface with other UEs 101. In one example, the contact interface 213 utilizes the communication network 105 to communicate with the other UEs 101. Additionally, the contact interface 213 can communicate with other UEs 101 directly through a wireless interface (e.g., BLUETOOTH, wireless local area network, or a personal area network). The contact interface 213 can utilize a list of contacts and contact information (e.g., phone number, wireless local area network address information, BLUETOOTH connection information, etc.) from a media application 107a and/or a social application 107n to contact the other UEs 101.

According to one embodiment, a runtime module 205 of a UE 101 can run a media application 107a. The media application 107a can show a user of the UE 101a list of contacts that can be associated with the user. Further, the list of user contacts can be derived, at least in part, by the media application 107a from a social service via, for instance, the social application 107n and/or the social service platform 111. By way of example, the media application 107a can request and receive a contact list or a contact infrastructure from a social application 107n. In addition or alternatively, the social application 107n can derive the contact infrastructure based on a list of contacts of the user as well as a list of contacts of those contacts. Additionally, the media application 107a may access the social service platform 111 directly to obtain the information. For example, the media application 107a may also receive one or more media streams (e.g., audio or video) or playlists over a network (e.g., communication network 105). The media application 107a can then mix together media streams using user input to produce new media content. In one embodiment, the user is afforded various options to manipulate media streams including, for instance, channel equalization, sound effects, crossover filtering, audio synchronization, audio/media forwarding and rewinding, amplification, audio combining, etc. In this manner, the user can be an audio/video disc jockey, composer, media content developer, etc. For example, the user can add vocals (e.g., singing, commentary, etc.) to one or more media streams using the media application 107a. Further, the media application 107a can play music or video from the media/audio streams or playlists. The media application 107a may also forward or relay media streams and playlists from one user to another user.

Figure 3:
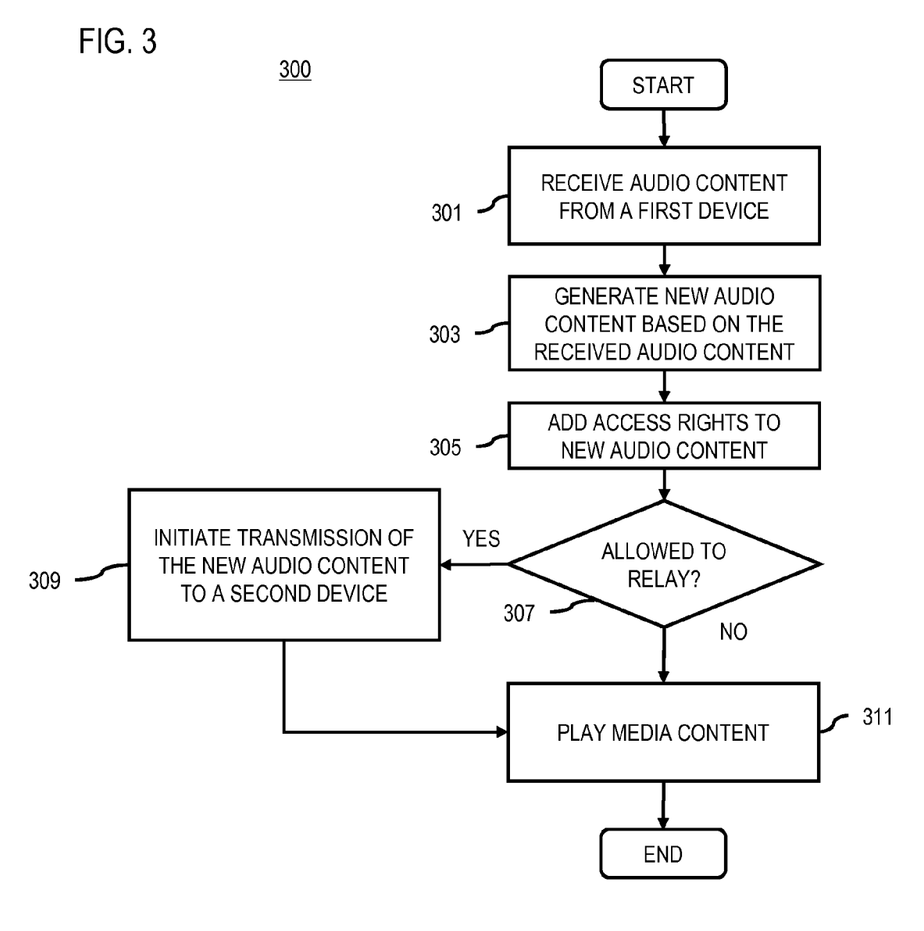
FIG. 3 is a flowchart of a process for relaying and mixing media using social networks, according to one embodiment.

FIG. 3 is a flowchart of a process for relaying and mixing media using social networks, according to one embodiment. In one embodiment, the runtime module 205 performs the process 300 and is implemented in, for instance, a chip set including a processor and a memory as shown FIG. 6. In this example, runtime module 205 included within a UE 101 (e.g., a first device) of a first user can be used to forward audio content to a contact. More specifically, the runtime module 205 can use a media application 107a to send audio or other media content (e.g., an audio/media stream, an audio/media playlist, an audio/media file, etc.) to a contact obtained from the social application 107n and/or the social service platform 111.

In the example of FIG. 3, a first user has initiated sending audio/media content to another UE 101 associated with a contact (e.g., a social networking contact) of the first user. In response, the runtime module 205 of the contact's UE 101 can initiate the process of receiving the audio/media content (step 301). The first user can be a member of a list of contacts associated with the contact (e.g., a phone list on the contact's UE 101, a social networking list, etc.). Additionally, the first user's UE 101 can be one of a plurality of UEs 101 sending or attempting to send audio/media content to the contact's UE 101. By way of example, the runtime module 205 receives a notification that the audio or other media content from the first user's UE 101 has been sent and is available. Then, the runtime module 205 can reply to the first user's UE 101 with a message requesting that the content be transferred. In one embodiment, the content can be transferred and received by the runtime module 205 as a real time audio stream (via e.g., streaming over BLUETOOTH, a cellular network, proximity radio transmissions, etc.). In addition or alternatively, a playlist or other information specifying the audio/media content can be sent to the runtime module 205. The runtime module 205 can then either download the specified media file from the media service platform 103 or play the media from a list of previously downloaded content if the specified media is available in the list. By way of example, the audio/media content can be original content created by the first user, content available on the media service platform 103, or a mix of original content and previously available content.

At step 303, the runtime module 205 generates new audio/media content based on the received audio/media content. For example, the runtime module 205 can remix received audio/media content using a media application 107a. The remixing can include, for instance, adding voice (e.g., commentary), applying audio or visual effects to the audio/media content, using a music synthesizer, using a drum machine or other instrumentals, or combining multiple audio streams. When combining two audio streams, the media application 107a as executed by the runtime module 205 is able to analyze the incoming audio streams and delay or modify either stream to synchronize the multiple audio streams. Additional audio/media content streams can be received from other UEs 101 other than from the first user. The generated content can take the form of an audio file, a video file, a media file, an audio stream, a video stream, a media stream, a playlist, or a combination of content. In one embodiment, the new audio/media content is a separate content (e.g., an audio stream that is based on and related to the received audio/media content, but does not incorporate the original audio stream) from the received audio/media content. The separate content can combined with the received audio/media content when played. The separate content can be synchronized with the received content so that when played, the content is in harmony.

At step 305, the runtime module 205 can add access rights to the new audio/media content. This can be in the form of a digital signature that will only allow authorized users to transfer the content a certain amount of nodes. The contact may use this feature to permit only a certain group of nodes (e.g., people) to receive or play the new audio/media content. In one example, the certain group of nodes can be direct contacts of the contact or contacts of direct contacts. In this manner, a contact can select to limit the number of nodes that can receive or use the new audio/media content. The contact may also utilize access rights to prevent UEs 101 that are associated with users who are unknown to the contact from listening to the contact's newly developed content (e.g., the contact's audio commentary about a song).

At step 307, the runtime module 205 can determine if the contact is allowed to relay the received audio/media content or the new audio/media content to a UE 101 (e.g., a second device) of a second user based on, for instance, the access rights associated with the content. By way of example, the runtime module 205 can make this determination by executing a media application 107a of the UE 101 of the contact. The media application 107a can, in turn, determine the rights needed to access the audio/media content by reading information stored with the content (e.g., metadata) or by querying the media service platform 103. The media application 107a can then query the second user's media application 107a to determine if the second user has the needed access rights. In one embodiment, the contact, first user, and second user are all a part of a social network. In another embodiment, the contact, first user, and second user are all a part of a subscription-based media service platform 103. The subscription-based media service may provide all subscribers rights to certain content (e.g., content available on the media service platform 103) while other content (e.g., user-created content) can have user-determined rights. Additionally, some users may have a license or other access to stream audio/media to non-subscribers of the service. In yet another embodiment, the contact, the first user, and the second user need not be part of the same social networking service. Instead, the contact infrastructure, which can represent an ad-hoc social network, can be based on one or more contact lists and/or phonebooks of the contact, the first user, and/or the second user. Each node can make available information regarding the node's contact access to other nodes in its contact lists. Thus, one or more contact lists and/or phonebooks from the UE 101, a social networking service, or other devices may be used to transmit and receive the content. The one or more contact lists can be combined into a sorted contact list that can organize the multiple contact lists into sorted lists (e.g., a top ten list, a most recent list, a most listened to list, a favorites list, etc.) using criteria.

If the runtime module 205 has the access rights to relay the audio/media content, at step 309, the runtime module 205 causes, at least in part, transmission of the received audio/media content and/or the new audio/media content to a UE 101 of the second user. The second user may be a member of a list of contacts associated with the contact. The first user and the second user may be members of the same list of contacts or a different list of contacts. In some embodiments, the transmission can occur directly from the runtime module 205 or other component of the contact's UE 101 to the second user's UE 101 over a wireless interface (e.g., BLUETOOTH). In other embodiments, the transmission occurs between the runtime module 205 and the UE 101 of the second user over the communication network 105. In addition or alternatively, the audio/media content may be transmitted to the UE 101 of the second user via the media service platform 103. In this way, user-created content may be cached on the media content database 109 of the media service platform 103 so that the second user can select when to retrieve the received audio/media content and new audio/media content.

At step 311, the runtime module 205 or UE 101 receiving the audio/media content can play the content. In one embodiment, a media application 107a can be used to play the audio/media content. The media application 107a can also determine if the user of the media application 107a has the rights to the content and play the content based on rights of the user of the media application 107a. Additionally, the media application 107a can receive multiple streams of content from multiple users. The user of the media application 107a may then select which content stream or streams to play.

With the above approach, users of UEs 101 can advantageously manipulate, compile, combine, etc. media content and share the content over a social network. For example, this approach enables a user to act as a disc jockey for friends and other contacts. In addition, the approach described herein enables users to share and obtain new media content from their social networking friends and contacts. Additionally, licensing and copyright information can be tracked by the runtime module 205 and/or the media service platform 103 to ensure that the users retrieve and produce legal content. Costs to a user and a service provider (e.g., a cellular service provider) can be reduced by utilizing BLUETOOTH or other direct connection means. Additionally, the above approach permits a user to utilize playlists determined by other users based on access rights, thereby enabling the user of the UE 101 to multitask.

Figure 4A:
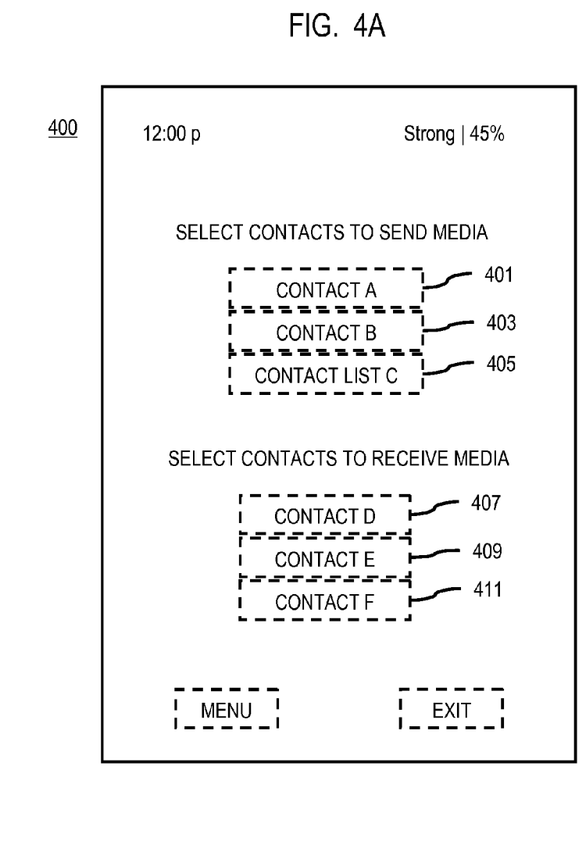
FIGS. 4A and 4B are diagrams of user interfaces utilized in the processes of FIG. 3, according to various embodiments.
Figure 4B:
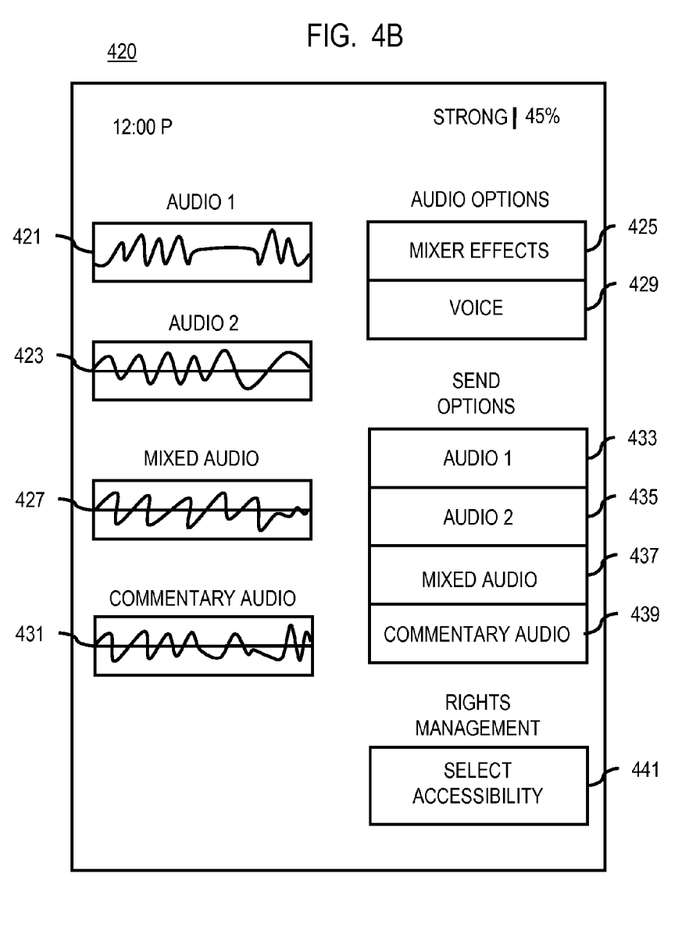

FIGS. 4A and 4B are diagrams of user interfaces utilized in the processes of FIG. 3, according to various embodiments. Interface 400 displays an options list that enables a user of a UE 101 to select which contacts to send media to and which contacts to receive media from. In one embodiment, the UE 101 is touch screen; in another embodiment, the UE 101 input incorporates a keypad or a scroll and click mechanism. Additionally, the UE 101 may have a speaker to output sound and a microphone to receive sound input. Under one scenario, the user can select which contact 401, 403, or multiple contacts via a contact list 405 can receive transmitted media or media streams. In this manner, the user may send the one or more selected contacts media which the contacts, for instance, did not have access to or knowledge of before the media was shared. Additionally, the media to be sent can be selected by the user.

In another scenario, the user selects which contacts 407, 409, 411 to receive media from. In some examples, the user selects multiple contacts 407, 409, 411 to from whom to receive media. A media application 107a may then determine the current media currently available from the group of multiple contacts 407, 409, 411 by determining a type of media content that the user regularly listens to, or by evaluating user preferences.

Interface 420 displays options available to a media application 107a of the UE 101. In one embodiment, the user is able to view incoming audio data 421, 423. Using the media application 107a of the UE 101, the user is able to mix media (e.g., audio files) using mixer effects 425. Mixer effects 425 may allow the user to mix audio 427 by combining audio data 421, 423 or by adding effects to audio data 421, 423. The mixer effects 425 can include audio synchronization to allow two audio files to be in rhythm, channel equalization, sound effects, crossover filtering, audio/media forwarding and rewinding, amplification, audio combining, electronic synthesizer effects, and other media options. Additionally, the user may add voice data to one or more audio data 421, 423 via a voice addition option 429. This voice data can be in the form of vocals or audio commentary 431. The voice data can be input using a microphone of the UE 101. Once any alteration of audio data 421, 423 is complete, the user may send audio data via send options such as sending original audio data 433, 435, sending mixed audio data 437, or sending commentary audio 439. Additionally, a user is provided the option to send multiple audio streams or data simultaneously. In one embodiment, the user can select accessibility options 441 to determine a class of people or specific people that are able to listen to the audio. A class of people can be contacts that the user directly knows as well as people in direct contact with those contacts. In this manner, the user is able to specify who can listen to modified content. Once the send options are selected, the user may be shown an interface 400 to select which contacts to inform of the available content. With this approach, a user is able to advantageously receive media content, generate new media content, and send the new media content to a variety of contacts in a social network via a UE 101. Additionally, this allows for the dissemination of both existing and new media content via the social network.

The processes described herein for relaying media and adding content to media via a social network may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
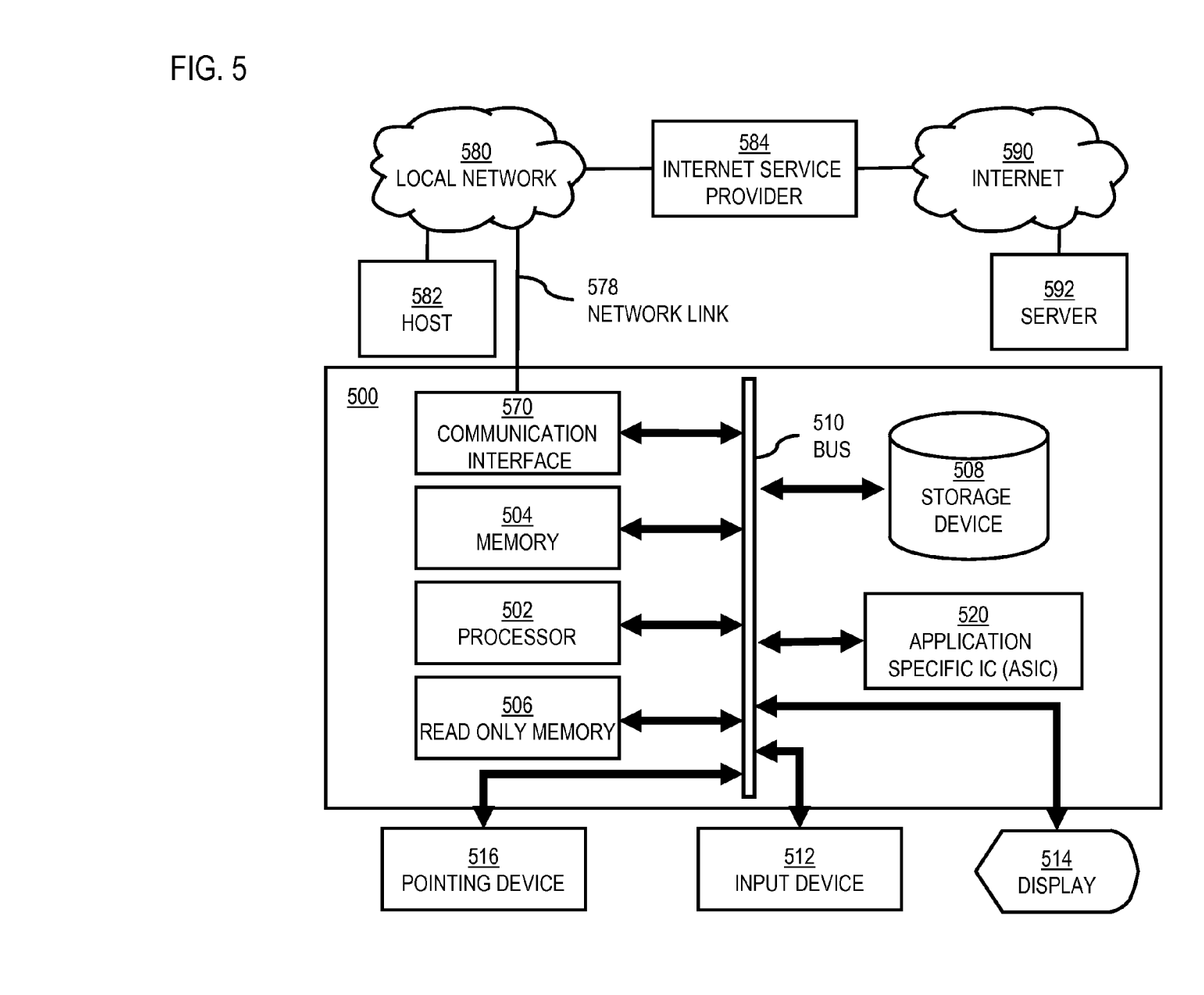
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to relay media and add content to media via a social network as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of relaying media and adding content to media via a social network.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to relaying media and adding content to media via a social network. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for relaying media and adding content to media via a social network. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for relaying media and adding content to media via a social network, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 to the UE 101.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
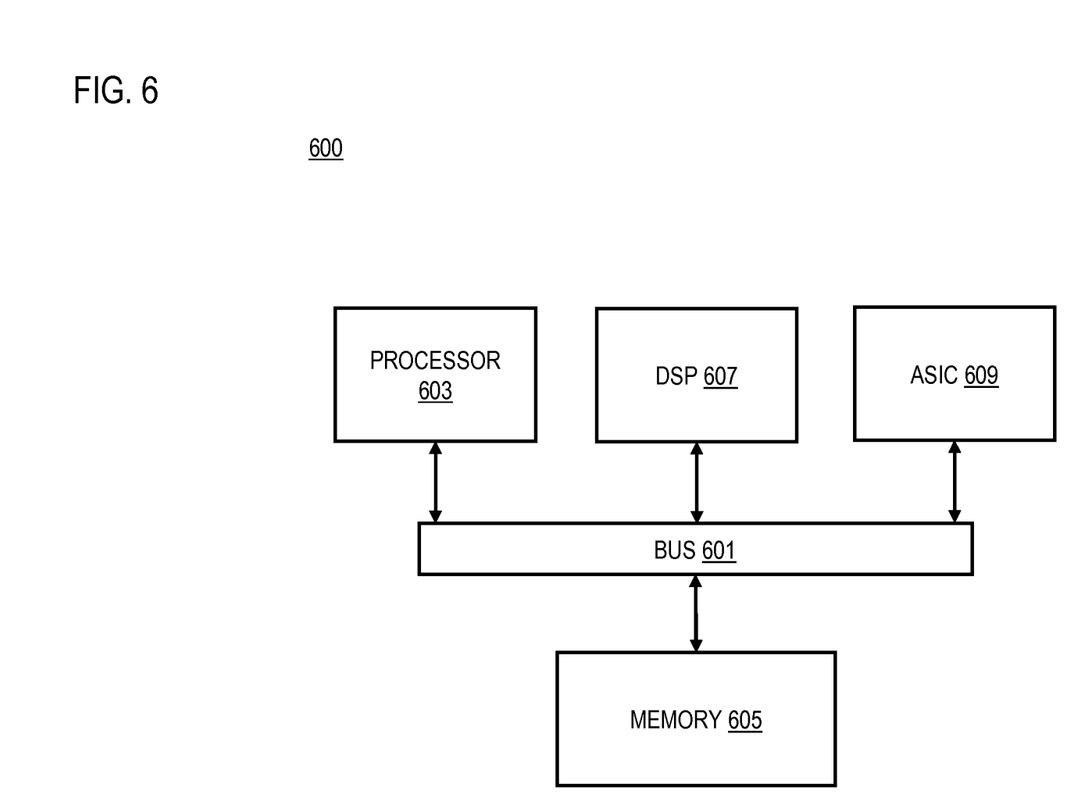
FIG. 6 is a diagram of a chip set that can be used to implement an embodiment of the invention.

FIG. 6 illustrates a chip set 600 upon which an embodiment of the invention may be implemented. Chip set 600 is programmed to relay media and add content to media via a social network as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of relaying media and adding content to media via a social network.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to relay media and add content to media via a social network. The memory 605 also stores the data associated with or generated by the execution of the inventive steps.

Figure 7:
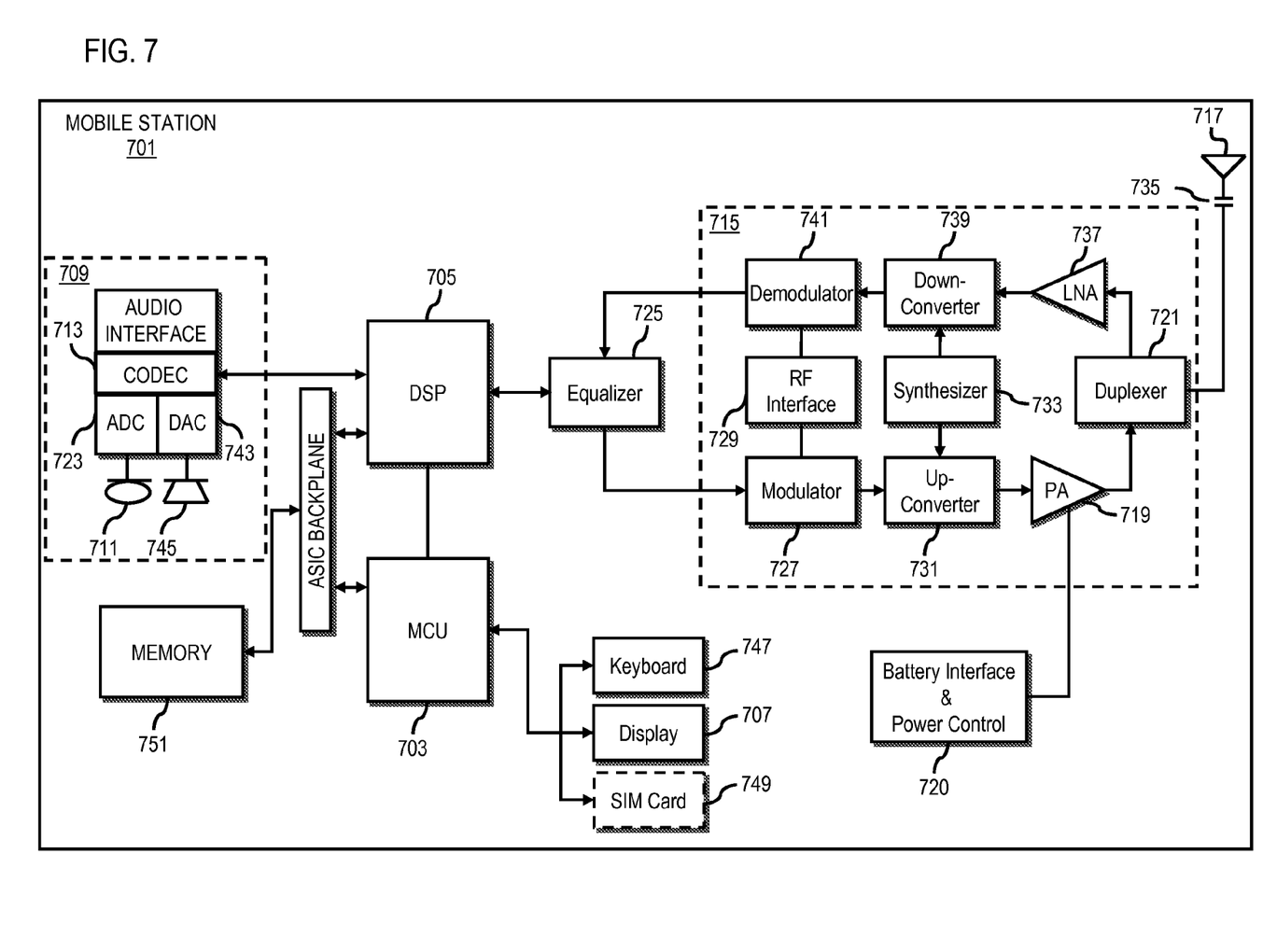
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1A, according to one embodiment. In some embodiments, mobile terminal 700, or a portion thereof, constitutes a means for performing one or more steps of relaying media and adding content to media via a social network. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a base-band integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of relaying media and adding content to media via a social network. The display unit 707 includes display circuitry configured to display at least a portion of a user interface of the mobile terminal (e.g., mobile telephone). Additionally, the display unit 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703, which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to relay media and add content to media via a social network. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   causing, at least in part, receiving audio content from one of a plurality of devices, wherein the one device is associated with a member of a first list of contacts;
   causing, at least in part, a modification of the audio content to generate new audio content;
   causing, at least in part, an addition of an access rights rule including a relay rights rule to the new audio content; and
   causing, at least in part, transmission of the new audio content and the access rights rule to other one of the devices, wherein the other one device is associated with a member of a second list of contacts,
   wherein the new audio content is modified with a voice, a sound effect, an instrumental sound, or a combination thereof, and wherein the access rights rule includes a digital signature to limit access to the new audio content to authorized members of the second list of contacts.

2. A method of claim 1, further comprising:
   receiving other audio content from a third device of the devices,
   wherein the modification comprises mixing the other audio content from the third device with the audio content from the one device to generate the new audio content.

3. A method of claim 1, wherein the audio content is transmitted in an audio stream and wherein the transmission is over a local wireless network.

4. A method of claim 1, further comprising:
   initiating transmission of a request for an audio download from a media service platform; and receiving the audio download from the media service platform.

5. A method of claim 4, further comprising:
requesting a license from the media service platform to generate the new audio content based on the audio download; and
receiving a license from the media service platform to generate the new audio content based on the audio download.

6. The method of claim 1, further comprising:
querying a media application executing at the other one device to obtain access rights associated with the second contact.

7. An apparatus comprising:
at least one processor; and
at least one memory including computer program code,
the at least one memory and the computer program code configured to, with the at least one processor, cause the apparatus to perform at least the following,
cause, at least in part, receiving audio content from one of a plurality of devices, wherein the one device is associated with a member of a first list of contacts;
cause, at least in part, a modification of the audio content to generate new audio content;
cause, at least in part, an addition of an access rights rule including a relay rights rule to the new audio content; and
cause, at least in part, transmission of the new audio content and the access rights rule to other one of the devices, wherein the other one device is associated with a member of a second list of contacts,
wherein the new audio content is modified with a voice, a sound effect, an instrumental sound, or a combination thereof, and wherein the access rights rule includes a digital signature to limit access to the new audio content to authorized members of the second list of contacts.

8. An apparatus of claim 7, wherein the apparatus is further caused to:
receive other audio content from a third device of the devices,
wherein the modification comprises mixing the other audio content from the third with the audio content from the one device to generate the new audio content.

9. An apparatus of claim 7, wherein the audio content is transmitted in an audio stream and wherein the transmission is over a local wireless network.

10. An apparatus of claim 7, wherein the apparatus is further caused to:
initiate transmission of a request for an audio download from a media service platform; and
receive the audio download from the media service platform.

11. An apparatus of claim 10, wherein the apparatus is further caused to:
request a license from the media service platform to generate the new audio content based on the audio download; and
receive a license from the media service platform to generate the new audio content based on the audio download.

12. A computer-readable storage device carrying one or more sequences of one or more instructions which, when executed by one or more processors, cause an apparatus to perform at least the following:
cause, at least in part, receiving audio content from one of a plurality of devices, wherein the one device is associated with a member of a first list of contacts;
cause, at least in part, a modification of the audio content to generate new audio content;
cause, at least in part, an addition of an access rights rule including a relay rights rule to the new audio content; and
cause, at least in part, transmission of the new audio content and the access rights rule to other one of the devices, wherein the other one device is associated with a member of a second list of contacts,
wherein the new audio content is modified with a voice, a sound effect, an instrumental sound, or a combination thereof, and wherein the access rights rule includes a digital signature to limit access to the new audio content to authorized members of the second list of contacts.

13. A computer-readable storage device of claim 12, wherein the apparatus is further caused to:
receive other audio content from a third device of the devices,
wherein the modification comprises mixing the other audio content from the third device with the audio content from the one device to generate the new audio content.

14. A computer-readable storage device of claim 12, wherein the audio content is transmitted in an audio stream and wherein the transmission is over a local wireless network.

15. A computer-readable storage device of claim 12, wherein the apparatus is further caused to:
initiate transmission of a request for an audio download from a media service platform; and
receive the audio download from the media service platform.

* * * * *